(12) United States Patent
Murray

(10) Patent No.: US 7,386,363 B2
(45) Date of Patent: Jun. 10, 2008

(54) SYSTEM OF MACHINE MAINTENANCE

(75) Inventor: Stuart C. Murray, Sarasota, FL (US)

(73) Assignee: PPI Technologies, L.L.C., Sarasota, FL (US)

( * ) Notice: Subject to any disclaimer, the term of this patent is extended or adjusted under 35 U.S.C. 154(b) by 383 days.

(21) Appl. No.: 09/971,406

(22) Filed: Oct. 5, 2001

(65) Prior Publication Data

US 2002/0042761 A1    Apr. 11, 2002

Related U.S. Application Data

(60) Provisional application No. 60/238,214, filed on Oct. 5, 2000.

(51) Int. Cl.
*G06F 19/00* (2006.01)

(52) U.S. Cl. .................... 700/175; 702/184

(58) Field of Classification Search ............ 705/26, 705/27, 28; 700/108–110, 169, 175, 180; 702/182–185
See application file for complete search history.

(56) References Cited

U.S. PATENT DOCUMENTS

| | | | | |
|---|---|---|---|---|
| 4,701,845 A * | 10/1987 | Andreasen et al. | ............ | 714/31 |
| 5,253,167 A * | 10/1993 | Yoshida et al. | ................ | 705/43 |
| 5,297,249 A * | 3/1994 | Bernstein et al. | ............ | 345/854 |
| 5,579,231 A * | 11/1996 | Sudou et al. | .................. | 700/95 |
| 5,872,923 A * | 2/1999 | Schwartz et al. | ............ | 709/205 |
| 5,971,273 A * | 10/1999 | Vallaire | ...................... | 235/381 |
| 5,982,362 A * | 11/1999 | Crater et al. | ................ | 715/719 |
| 6,002,855 A | 12/1999 | Ladner et al. | .......... | 395/500.01 |
| 6,134,557 A | 10/2000 | Freeman | ...................... | 707/102 |
| 6,243,619 B1 * | 6/2001 | Inamasu et al. | ............. | 700/180 |
| 6,244,174 B1 * | 6/2001 | Sirowitzki et al. | .......... | 101/212 |
| 6,282,518 B1 | 8/2001 | Farrell et al. | .................. | 705/26 |
| 6,298,308 B1 * | 10/2001 | Reid et al. | ..................... | 702/56 |
| 6,321,348 B1 | 11/2001 | Kobata | ........................ | 714/37 |
| 6,385,491 B1 * | 5/2002 | Lindemans et al. | ......... | 607/120 |
| 6,385,497 B1 * | 5/2002 | Ogushi et al. | ............... | 700/110 |
| 6,445,969 B1 * | 9/2002 | Kenney et al. | ............. | 700/108 |
| 6,594,642 B1 * | 7/2003 | Lemchen | ...................... | 705/26 |
| 6,606,570 B2 * | 8/2003 | Bugarin et al. | ................ | 702/45 |
| 6,615,183 B1 * | 9/2003 | Kolls | ........................... | 705/26 |
| 6,852,068 B2 * | 2/2005 | Ogawa | .......................... | 482/8 |
| 6,915,342 B1 * | 7/2005 | Motoyama | .................. | 709/224 |
| 6,924,445 B2 * | 8/2005 | Bresciani et al. | ............ | 200/244 |
| 2002/0026385 A1 * | 2/2002 | McCloskey et al. | ........... | 705/27 |
| 2003/0023336 A1 * | 1/2003 | Kreidler et al. | ............. | 700/108 |

\* cited by examiner

*Primary Examiner*—Andrew Joseph Rudy
(74) *Attorney, Agent, or Firm*—Gifford, Krass, Sprinkle, Anderson, Citkowski, P.C.

(57) ABSTRACT

A system for remote maintenance for a machine. The system includes a database having information for a plurality of machines. A customer accesses the database in order to receive an illustration of at least one of said plurality of machines. Thereafter, the customer identifies a portion of the machine illustration and is provided with ordering data for that portion of the machine (e.g., a machine component, subcomponent or part). Using this ordering data the customer can order parts of its machine. Additionally, using an imaging device, such as a digital camera, the customer can transmit images of the machine to an off-site expert and receive real-time information related to the assembly, installation, repair or maintenance of the machine.

24 Claims, 2 Drawing Sheets

SYSTEM OF MACHINE MAINTENANCE

RELATED APPLICATION

This application claims priority of U.S. Provisional Patent Application 60/238,214 filed Oct. 5, 2000 and is incorporated herein by reference.

BACKGROUND

1. Field of the Invention

The present invention relates generally to a system for machine maintenance. More particularly, the present invention concerns a system for receiving information (including assembly, installation or repair instructions) from an expert at a remote location and for remotely identifying and ordering one or more components, subcomponent or parts for a machine.

2. Reference to Related Art

Modern manufacturing operations depend upon machines to perform all manner of tasks. Indeed, machines have become so important to today's economy that the failure of even a single machine (e.g., an automotive assembly machine) can cost a manufacturer many thousands of dollars for every minute that the machine is disabled. Therefore, an important element of any manufacturing operation is the care and maintenance of its machines. To this end, it is essential that a manufacturer have in place a maintenance system that is designed to keep its operations and its machines running at peak performance levels.

Regardless of the lengths to which a manufacturer might go to maintain its machines in good working order, an inevitable aspect of a typical maintenance program involves machine repairs. Unfortunately, if the machine in need of repair is an assembly station or some other complex piece of equipment, it is often necessary to call in an outside expert or engineer to execute the required repair. If this outside expert is located beyond the manufacturer's local area, he or she must be flown in and possibly lodged overnight. Furthermore, if the machine in need of repair is a custom designed machine or has certain unique features, it may be necessary for the manufacturer to keep the expert "on call"; which can significantly increase the manufacturer's overall repair budget.

No matter where the expert is located, until the repair is accomplished, the manufacturer must try to continue its operations without the machine. However, depending upon the machine and the size of the manufacturer, continued operations may not be possible until the repairs are complete. Therefore, it should be immediately clear that prior art systems that rely upon the arrival of on-site experts are not cost effective, are inefficient and can have a significant impact on revenue and employment.

In addition to machine repairs, an effective maintenance system must also allow the user to order and purchase replacement parts. The current art provides an order process for machine parts whereby the owner of a machine identifies a part for replacement, contacts a manufacturer or distributor of the part, and places an order. There are, however, several disadvantages to the present art. One such disadvantage is the time, effort, and expense required to identify the part by description and part number. Typically, this involves a process whereby the owner of the machine must power down the machine and remove one or more components to isolate the component containing the part to be replaced. Once the owner isolates the component, the owner must further disassemble the component to locate the subcomponent or part to be replaced. Once disassembled, the owner must identify reordering information located on the part itself and on the machine; e.g., a part number and a model number for the machine.

A second disadvantage is the time, effort, and expense associated with locating a factory approved replacement source and placing an order. Typically, this location process involves multiple phone calls to various sources in an attempt to locate the replacement part, or lengthy reorder forms that must be manually completed and submitted to one or more sources. As can be seen, the aforementioned reordering steps result in periods of downtime for the machine involved, thus incurring significant costs attributed to the lost productivity during those periods of downtime; the manual labor involved in identifying the part to be ordered; and the manual process by which an order is placed.

Therefore, what is needed is a maintenance system that allows repairs to be accomplished quickly and a fast, efficient, end-to-end order process whereby an owner of a machine (hereafter, customer) can readily identify a part to be replaced and electronically order that part based on the identification information.

SUMMARY OF THE INVENTION

The present invention provides a system that overcomes all of the above-mentioned disadvantages of the previously known systems. In brief, the system includes a component ordering system that includes the steps of: providing a database having information for a plurality of machines; providing access to said database to display an illustration of at least one of said plurality of machines; and sending ordering data for a selected portion of said illustration representing at least one component of the at least one machine.

More specifically, in the component ordering system, the customer utilizes a user interface (e.g., a PC) to access a database that is provided at a location remote from the customer. Preferably, this database stores information concerning one or more of the customer's machine(s) (i.e., manufacturing data, dimension, description, manuals, illustrations of the machine and related documentation). Using the Internet or other means of electronic communication, the customer accesses the database with the user interface, selects one of its machines and is shown an illustration of the selected machine on the user interface. The customer then selects a portion of the illustration representing at least one component of the machine. The selection of a component of the machine results in the transmission of ordering data for that component from the database and the display of that data on the user interface. The customer then uses the ordering data to transmit an order for the component to the manufacturer or a vendor. Finally, the customer receives a confirmation that the order has been processed.

It should be understood that the database and illustration of the machine are preferably arranged using a hierarchical model whereby information is presented to the customer in varying degrees of detail, starting with high-level information pertaining to the machine and ending with detailed information pertaining to a part of the machine. It will also be appreciated that the customer can select a portion of the selected component and obtain ordering data for a sub-component of the machine. Indeed, this process can be carried forward and repeated to provide the customer with ordering data for smaller and smaller portions of the machine.

The component ordering system may also alternatively include an accounting system into which the ordering data can be transferred. The accounting system permits the customer to generate electronic or printed documentation for each order.

Additionally, the system of the present invention may alternatively include an expert information system that allows the customer to receive expert information, including assembly, installation and repair instructions, from an expert or engineer for the machine that is stationed at a remote location. This further embodiment of the invention includes the step of providing an imaging device (such as a digital video camera) and connecting that imaging device to the user interface. Using the imaging device, the customer transmits (via the Internet) real-time images of the machine to a user interface for an off-site expert. The expert (who was preferably contacted ahead of time), reviews the images of the machine and can convey expert information (including assembly, installation and repair instructions) to the customer using the user interface or through the use another means of communication (e.g., telephone, video conference, etc.). Finally, the customer receives the instructions regarding the machine from the expert and executes the any necessary actions.

DETAILED DESCRIPTION

Figure 1:
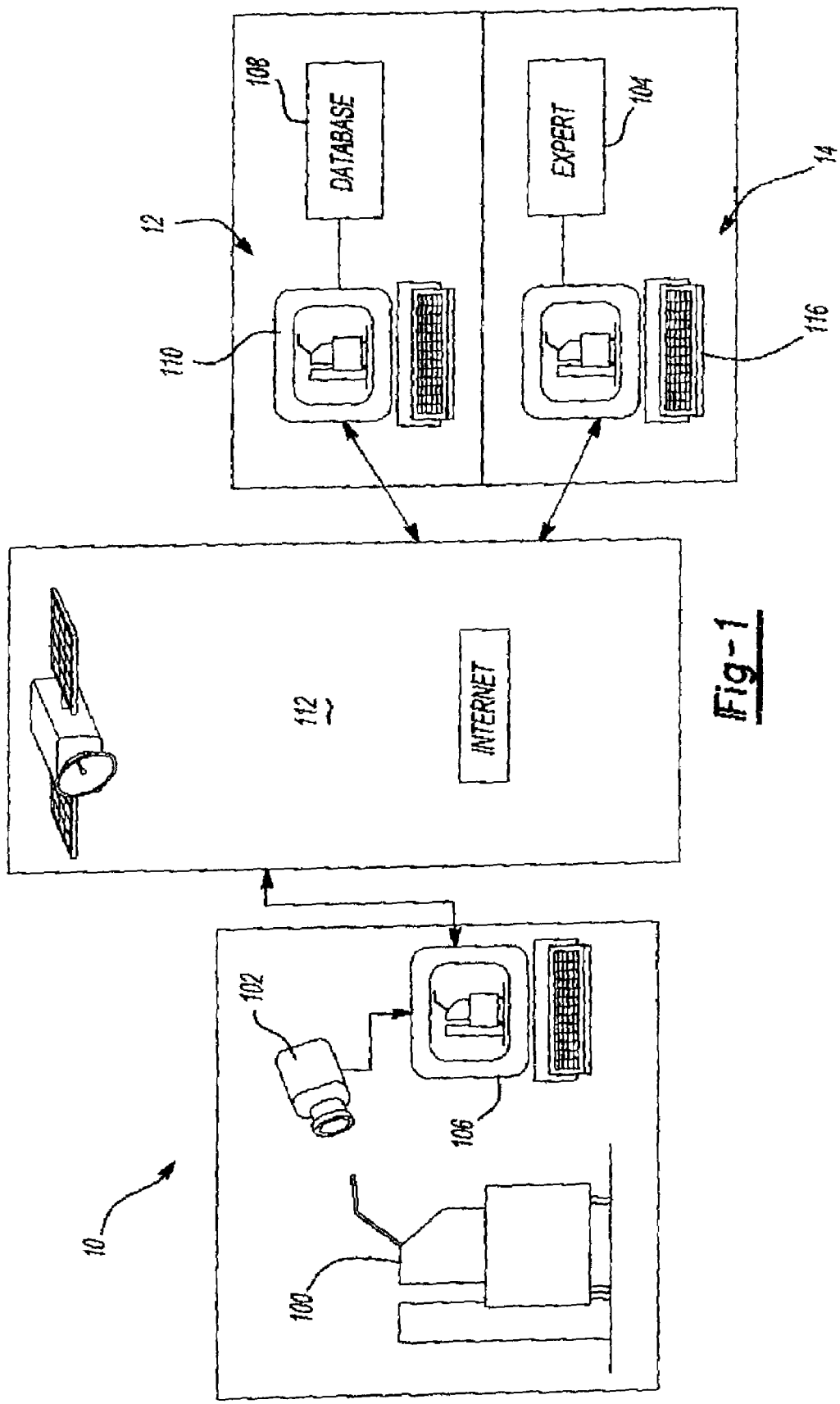
FIG. 1 is a diagrammatic view of a system of machine maintenance in accordance with the present invention.
Figure 2:
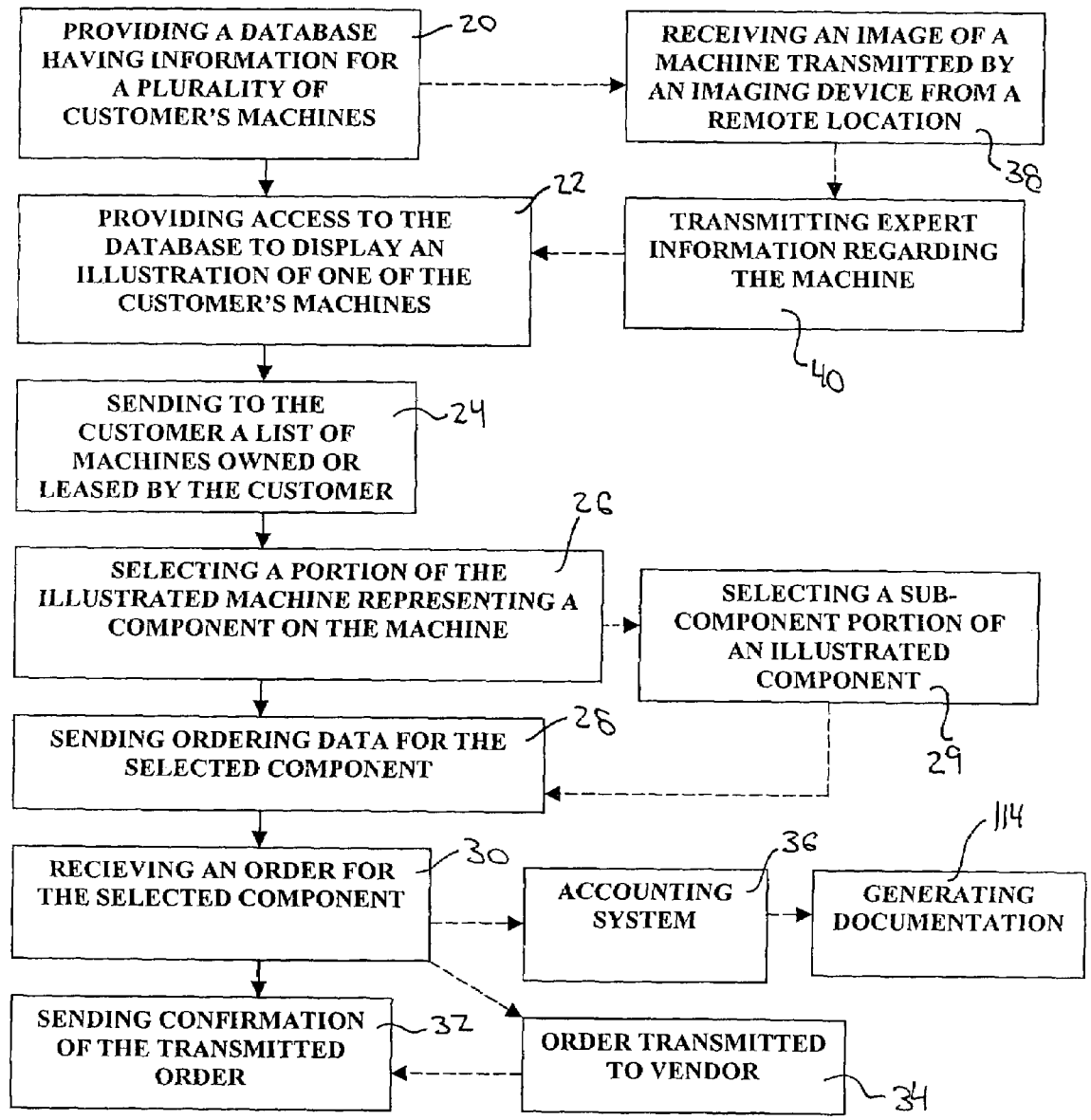
FIG. 2 is a flowchart view of a preferred embodiment and alternative embodiments of the system of the present invention.

Referring now to FIGS. 1 and 2, the system of machine maintenance 10 of the present invention preferably includes a component ordering system 12 and an expert information system 14. Preferably, the component ordering system 12 uses a hierarchical model whereby information is presented to the customer in varying degrees of detail, starting with high-level information pertaining to the machine and ending with detailed information pertaining to a customer's machine 100. The expert information system 14 uses an imaging device 102 to transmit images of a machine 100 to an off-site expert 104 so that a customer can receive instructions from the expert 104.

Still referring to FIGS. 1 and 2, preferably, the system 10 of the present invention includes a first step 20 of providing a database 108 having information (i.e., manufacturing data, dimension, description, manuals, illustrations of the machine and related documentation) for a plurality of machines. The database 108 is preferably stored in a user interfaceable device, such as a web site server 110.

In a second step 22, the customer is provided with access to the database and is able to display an illustration of at least one of the customer's machines contained in the database. In this second step 22, the customer utilizes a user interface 106 (such as a P.C.) to access the database 108 via a two-way communications link 112 such as the Internet, radio, cable or satellite link. Initially, the web server 110 displays a login web page including text fields for a login and password. The customer utilizes the user interface 106 to enter the login and password previously assigned to the customer. Preferably, the user interface 106 is capable of displaying a representation of the customer's machine 100 and transmitting data (e.g., a computer device such a laptop PC connected to the Internet).

Upon gaining access to the database 108 the customer views one or more web pages associated with the web site server 110. The web site server 110 and its associated software retrieve from the database 108 and transmit to the customer a list of machines owned or leased by the customer corresponding to the login and password. Preferably, the web site server 110 transmits and displays the list of machines and their corresponding model numbers on a web page, and the customer selects the machine for which a component is to be ordered.

Upon selection of a machine from the database 108 (e.g., such as a packaging machine composed of a number of stock or custom subcomponents), the web site server 110 and its associated software transmit for display on the user interface 106 a web page depicting an illustration of the machine 100, including its major components. This illustration of the machine 100 is particularly important when the customer possesses a variety of different machines; some or all of which may be customized or otherwise unique. Specifically, the illustration of the machine 100 assists the customer in ensuring that it has chosen the correct machine.

In a fourth step 26, the customer, utilizing an input device such as a mouse, passes the cursor over an area of the illustration corresponding to a component to be ordered or reordered, and selects the component by clicking on the mouse.

In a fifth step 28, the web site server 110 and its associated software retrieves from the database 108 ordering data pertinent to the selected component, and transmits and displays the same in the form of an illustration including the subcomponents of the illustrated component. Preferably, the ordering data for the selected component includes both technical information for the component (i.e., descriptions, dimensions, functions, tolerances and machine documentation) and sales information (i.e., part numbers, descriptions, per unit or discount unit costs).

The customer may also view the illustrated component, and repeat the previous selection process, by the additional step 29 of selecting a sub-component of the component to be ordered. In selecting a sub-component, the customer uses the input device to pass the cursor over an area of the now illustrated, and preferably enlarged, component (which, as discussed above was previously selected) corresponding to a sub-component to be ordered or reordered, and selects the sub-component component by clicking the input device. It should be appreciated that this process may be repeated down through three or more levels to provide the customer with illustrations and order data for sub-sub-components and individual parts or supplies.

As stated above, upon selection of the component (sub-component, etc.), the web site server 110 and its associated software retrieves and sends the ordering data for a selected portion of said illustration representing at least one component of the at least one machine or otherwise corresponding to the selected subcomponent.

A sixth step 30, permits the customer to place an order; e.g., the customer selects the component, sub-component, part or parts or supplies based on the ordering data displayed, inputs quantity information, confirms the selection and information, and submits the order.

In a seventh step 32, upon receipt of the submitted order, the web site server 110 transmits a confirmation message that is received by the customer. Preferably, prior to transmission of the confirmation message the server and its associated software electronically retrieve and verify on-hand inventory necessary to fill the order; generate all necessary electronic and printed documentation; decrement supply information according to the number of parts ordered; and electronically place orders to replenish depleted inventory supplies.

In a first alternative embodiment, upon receipt of the requested order from the customer, the system includes a step 34 whereby the web site server 110 electronically contacts a computer device associated with one or more vendors via a public or private network, such as the Internet. The web site server 110 and its associated software negotiate placement of the order with the computer device of the vendor, whereafter the order is filled and shipped to the customer according to a predetermined plan.

In a second alternative embodiment, the system includes a further step 36 whereby upon placement of the order by the customer, the web site server 110 dynamically transfers all data pertinent to the submitted order to an automated accounting system. The accounting system is capable of generating electronic or printed documentation 114 for the customer; e.g., a purchase order, a shipping bill, and an invoice.

In a third alternative embodiment, the customer utilizes an expert information system 14 to receive information, including assembly, installation and repair instructions, from an expert 104 or engineer of the machine 100 who is stationed at a remote location.

Still referring to FIGS. 1 and 2, this third embodiment includes a step 38 whereby the machine 100 includes an imaging device 102 capable of transmitting real-time images of the machine 100. Preferably, the imaging device 102 is a digital video camera. However, a digital photographic camera or similar device may also be used. The imaging device 102 is preferably movably mounted on the machine 100 by means of a cable or gantry, but may also be mount so that it is removable from the machine 100.

The imaging device 102 is preferably electronically connected to a user interface 106, such a laptop computer, which is capable of transmitting an image of the machine 100 that is generated from the imaging device over a communications network to an expert 104 at a remote location. Preferably, the image is transmitted to the expert 104 via a communications link 112 (e.g., the Internet). However, other electronic communication systems, such a radio, satellite, cable, etc. may also be used to carry and transmit the image to the expert.

The expert 104 is also preferably equipped with a user interface 116 (e.g., a laptop computer) that permits real-time viewing of the image being transmitted by the customer. The expert 104 can thus review the image and, in further step 40, transmit expert information that is received by the customer regarding what action (if any) might be undertaken by the customer to assemble, install or repair the machine. The information received by the customer is preferably transmitted by the expert 104 via the user interface 116. However, another means of communication (e.g., telephone, videoconference, etc.) could also be used.

This system has particular advantages when the machine in question is a customized or otherwise unique machine that is not capable of being installed, constructed or repaired by a general service contractor.

Having illustrated and described the principles of the system and system of the present invention in various embodiments, it should be apparent to those skilled in the art that the embodiment can be modified in arrangement and detail without departing from such principles. For example, the physical manifestation of the computer media may be changed if preferred. Therefore, the illustrated embodiments should be considered only as example of the invention and not as a limitation on its scope.

I claim:

1. A method for remote maintenance for a machine, the method comprising the steps of:
   providing a user interfaceable device having a database and being operable to be remotely accessed, to receive an image of a machine at a remote location and to transmit information concerning the machine, the database including information about a plurality of machines, the information about the plurality of machines including an illustration of each machine;
   receiving at the user interfaceable device a command to display an illustration for one machine of the plurality of machines;
   transmitting the illustration of the one machine of the plurality of machines to a location remote from the user interfaceable device;
   receiving at the user interfaceable device a command to display a selected portion of the illustration of the one machine of the plurality of machines, the selected portion representing a component of the one machine; and
   transmitting ordering data for the selected portion of the illustration to a location remote from the user interfaceable device.

2. The method of claim 1, further comprising the step of receiving at the user interfaceable device an order for the component of the one machine represented by the selected portion.

3. The method of claim 2, further comprising the step of providing an accounting system.

4. The method of claim 3, further comprising the step of transferring the order for the component to the accounting system.

5. The method of claim 2, further comprising the step of generating documentation for the order.

6. The method of claim 5, wherein the documentation is in an electronic format.

7. The method of claim 5, wherein the documentation is in a printed format.

8. The method of claim 2, further comprising the step of transmitting a confirmation of the order.

9. The method of claim 2, further comprising the step of transmitting an inventory verification request.

10. The method of claim 2, further comprising the step of transmitting the order for the component to a component vendor.

11. The method of claim 1, wherein the ordering data comprises technical information.

12. The method of claim 11, wherein the technical information is selected from a group consisting of: component descriptions, component dimensions, component functions, component tolerances and component documentation.

13. The method of claim 1, wherein the ordering data comprises sales information.

14. The method of claim 13, wherein the sales information is selected from a group consisting of: part numbers, descriptions, per unit cost and discount unit cost.

15. The method of claim 1, further comprising the step of transmitting ordering data for a sub-portion of the selected portion, the sub-portion representing a sub-component of the component.

16. The method of claim 1, further comprising the steps of providing at a remote location with the machine an imaging device operable to capture and transmit an image of the machine.

17. The method of claim 16, wherein the imaging device comprises a digital camera.

18. The method of claim 17, wherein the digital camera comprises a digital video camera.

19. The method of claim 16, further comprising the step of transmitting information from the user interface regarding the machine at the remote location.

20. The method of claim 19, wherein the information is selected from the group consisting of: assembly information for the machine, installation information for the machine, maintenance information for the machine and repair information for the machine.

21. A method for remote maintenance for a machine comprising the steps of:

providing at a first location a user interfaceable device having a database and being operable to be remotely accessed, the database including information about a plurality of customer machines, the information about the plurality of customer machines including an illustration of each customer machine;

providing at a second location a customer machine;

providing at the second location an imaging device electronically operable to capture and transmit an image of the customer machine at the second location;

providing at a third location a second user interface operable to receive an image of the customer machine at the second location and transmit information;

receiving at the second user interface an image of the customer machine at the second location;

transmitting from the second user interface to the first user interface information concerning the customer machine at the second location.

22. The method of claim 21, wherein the imaging device comprises a digital camera.

23. The method of claim 22, wherein the digital camera comprises a digital video camera.

24. The method of claim 21, wherein the first location and the third location are the same location.

\* \* \* \* \*